(12) United States Patent
Salah et al.

(10) Patent No.: US 12,020,372 B2
(45) Date of Patent: Jun. 25, 2024

(54) METHOD FOR ANALYZING A PHOTO OF A DENTAL ARCH

(71) Applicant: DENTAL MONITORING, Paris (FR)

(72) Inventors: Philippe Salah, Paris (FR); Thomas Pellissard, Paris (FR); Guillaume Ghyselinck, Cantin (FR); Laurent Debraux, Paris (FR)

(73) Assignee: DENTAL MONITORING, Paris (FR)

( * ) Notice: Subject to any disclaimer, the term of this patent is extended or adjusted under 35 U.S.C. 154(b) by 140 days.

(21) Appl. No.: 17/259,504

(22) PCT Filed: Jul. 10, 2019

(86) PCT No.: PCT/EP2019/068557
§ 371 (c)(1),
(2) Date: Jan. 11, 2021

(87) PCT Pub. No.: WO2020/011863
PCT Pub. Date: Jan. 16, 2020

(65) Prior Publication Data
US 2022/0139028 A1 May 5, 2022

(30) Foreign Application Priority Data
Jul. 13, 2018 (FR) ..................................... 1856497

(51) Int. Cl.
*G06T 17/00* (2006.01)
*G06T 5/50* (2006.01)
*G06T 15/04* (2011.01)

(52) U.S. Cl.
CPC ............... *G06T 17/00* (2013.01); *G06T 5/50* (2013.01); *G06T 15/04* (2013.01);
(Continued)

(58) Field of Classification Search
None
See application file for complete search history.

(56) References Cited

U.S. PATENT DOCUMENTS

2011/0268327 A1\* 11/2011 Getto ................... G09B 23/283
382/128
2017/0103569 A1\* 4/2017 Wu .......................... G06T 15/04
(Continued)

OTHER PUBLICATIONS

International Search Report corresponding to International Application No. PCT/EP2019/068557 dated Dec. 3, 2019, 8 pages.
(Continued)

*Primary Examiner* — Jeffrey J Chow
(74) *Attorney, Agent, or Firm* — Ronald M. Kachmarik; Cooper Legal Group LLC

(57) ABSTRACT

A method for transforming an "original" view of an "original" digital three-dimensional model into a hyper-realistic view. The method includes creating a "transformation" learning base of more than 1000 "transformation" records. Each transformation record includes a "transformation" photo representing a scene, and a view of a "transformation" digital three-dimensional model modeling the scene, or "transformation view", the transformation view representing the scene in the same way as the transformation photo. The method includes training at least one "transformation" neural network, by way of the transformation learning base. The method includes submitting the original view to the at least one transformation neural network, such that it transforms it into a hyper-realistic view.

3 Claims, 4 Drawing Sheets

21) create a transformation learning base, each transformation record comprising a transformation photo and a view of a transformation model modeling the photographed scene, the view representing said scene in the same way as the transformation photo 22) train a neural network by way of the transformation learning base 23) submit an original view of a model to the neural network such that it transforms it into a hyper-realistic view

(52) U.S. Cl.
CPC .............. *G06T 2207/20081* (2013.01); *G06T 2207/20084* (2013.01); *G06T 2207/30036* (2013.01); *G06T 2210/41* (2013.01)

(56) References Cited

U.S. PATENT DOCUMENTS

| | | | |
|---|---|---|---|
| 2018/0028065 A1* | 2/2018 | Elbaz | G06T 17/00 |
| 2018/0085201 A1* | 3/2018 | Wu | G16H 70/60 |
| 2018/0168781 A1* | 6/2018 | Kopelman | A61C 19/04 |
| 2019/0259220 A1* | 8/2019 | Lancelle | G06T 15/50 |
| 2019/0313963 A1* | 10/2019 | Hillen | A61B 5/7475 |
| 2020/0015943 A1* | 1/2020 | Reynard | G06T 7/12 |
| 2021/0174543 A1* | 6/2021 | Claessen | A61C 9/004 |
| 2021/0259807 A1* | 8/2021 | Salah | A61B 1/32 |
| 2021/0272281 A1* | 9/2021 | Salah | G16H 50/50 |

OTHER PUBLICATIONS

Lassner Christoph, et al., "A Generative Model of People in Clothing", 2017 IEEE International Conference on Computer Vision (ICCV), IEEE, Oct. 22, 2017, pp. 853-862.

Faisal Mahmood, et al., "Deep Learning with Cinematic Rendering—Fine-Tuning Deep Neural Networks Using Photorealistic Medical Images", arxiv.org, Cornell University Library, 201 OLIN Library Cornell University, Ithaca, NY 14853, May 22, 2018.

Chenglei Wu, et al., "Model-based teeth reconstruction" ACM Transactions on Graphics (TOG), ACM, US, vol. 35, No. 6, Nov. 11, 2016, pp. 1-13.

* cited by examiner

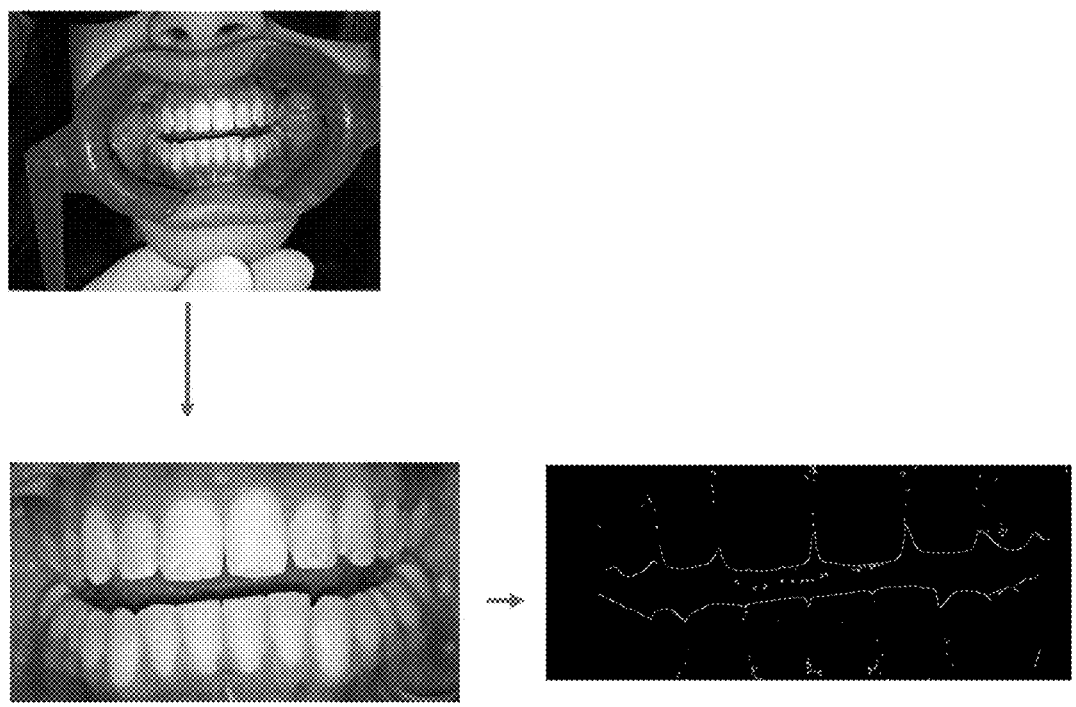
Fig. 9
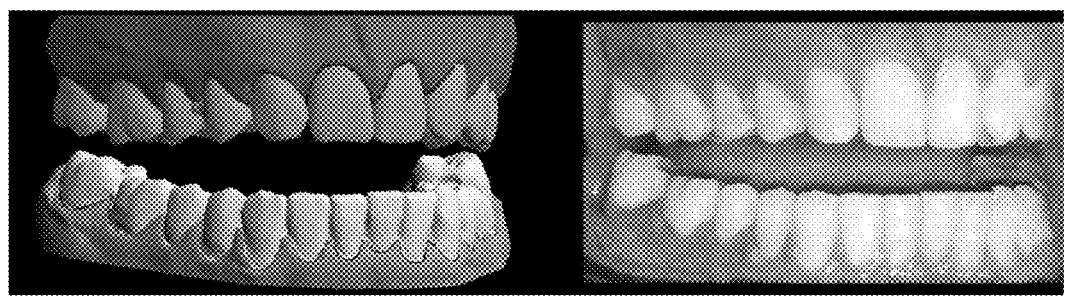
Fig. 10aFig. 10b

METHOD FOR ANALYZING A PHOTO OF A DENTAL ARCH

TECHNICAL FIELD

The present invention relates to the field of analyzing photos of dental arches.

It relates in particular to methods for making three-dimensional models and views of such models hyper-realistic, creating a learning base intended to train a neural network based on these hyper-realistic views, and analyzing photos of dental arches using the neural network thus trained.

PRIOR ART

The most recent techniques use neural networks to evaluate dental situations based on images, conventionally X-rays, in particular for post-mortem identification.

A "neural network" or "artificial neural network" is a set of algorithms well known to a person skilled in the art. The neural network may in particular be chosen from among:
networks specializing in image classification (which are called convolutional neural networks (CNNs)), for example
AlexNet (2012)
ZF Net (2013)
VGG Net (2014)
GoogleNet (2015)
Microsoft ResNet (2015)
Caffe: BAIR Reference CaffeNet, BAIR AlexNet Torch: VGG_CNN_S, VGG_CNN_M, VGG_CNN_M_2048, VGG_CNN_M_10 24, VGG_CNN_M_128, VGG_CNN_F, VGG ILSVRC-2014 16-layer, VGG ILSVRC-2014 19-layer, Network-in-Network (Imagenet & CIFAR-10)
Google: Inception (V3, V4).
networks specializing in location and detection of objects in an image (object detection networks), for example:
R-CNN (2013)
SSD (Single Shot Multibox Detector: object detection network), faster R-CNN (faster region-based convolutional neural network: object detection network) faster R-CNN (2015)
SSD (2015).
The above list is not exhaustive.

In order to be operational, a neural network has to be trained using a learning process called "deep learning", based on an unpaired or paired learning base.

A paired learning base consists of a set of records each comprising an image and a description of the image. By presenting the records at input of the neural network, said neural network gradually learns how to generate a description for an image that is presented thereto.

For example, each record in the learning base may comprise an image of a dental arch and a description identifying, in this image, the representations of the teeth, or "tooth regions", and the corresponding tooth numbers. After having been trained, the neural network will thus be able to identify, in an image that is presented thereto, the representations of the teeth and the corresponding tooth numbers.

The quality of the analysis performed by the neural network depends directly on the number of records in the learning base. The learning base conventionally contains more than 10 000 records.

In the dental field, creating a large number of records is made difficult by the limited number of images that are produced, in particular by orthodontists and dentists, and by the generally confidential nature of these images.

The quality of the analysis performed by the neural network also depends on the quality of the descriptions of the records in the learning base. These descriptions are conventionally generated by an operator who defines the tooth regions by way of a computer and who, after having identified the corresponding tooth, for example "upper right canine", accordingly assigns a number thereto. This operation is called labeling. If the operator makes a mistake in identifying the tooth or when entering it, the description is incorrect and the quality of the training is thereby degraded.

Operators who carry out the labeling may have different interpretations of one and the same image. The quality of the learning base will therefore depend on the interpretations adopted by the operators.

There is therefore a continuing need for a method for creating a high-quality learning base.

One aim of the invention is to meet this need.

SUMMARY OF THE INVENTION

The invention proposes a method for enriching a historical learning base, said method comprising the following steps:
1) generating a digital three-dimensional model of a scene, in particular of a dental scene, or "historical model", and preferably a description of said historical model;
2) creating a hyper-realistic or "photorealistic" view of said historical model;
3) preferably on the basis of the description of said historical model, creating a description of said hyper-realistic view, or "historical description";
4) creating a historical record consisting of the hyper-realistic view and the description of said hyper-realistic view, and adding the historical record to the historical learning base.

As will be seen in more detail in the remainder of the description, an enrichment method according to the invention uses models, and in particular scans performed by dental professionals, to create hyper-realistic views equivalent to photos. The invention thus advantageously makes it possible to generate a learning base that makes it possible to train a neural network to analyze photos, even though the learning base does not necessarily contain photos.

Preferably, in step 1), a description of the historical model is generated and, in step 3), the historical description is created, at least in part, from the description of the historical model.

Preferably, the historical model is divided into elementary models, and then, in step 1), a specific description for an elementary model, preferably for each elementary model represented in the hyper-realistic view, is generated in the description of the historical model, and, in step 3), a specific description for the representation of said elementary model in the hyper-realistic view is included in the historical description, at least part of the specific description being inherited from said specific description.

For example, elementary models representing the teeth, or "tooth models", in the historical model are created, and, in the description of the historical model, a specific description is created for each tooth model, for example so as to identify the corresponding tooth numbers. It is then easy to fill in the historical description accordingly. In particular, the tooth numbers of the tooth models may be assigned to the representations of these tooth models in the hyper-realistic view. Advantageously, once the historical model and its description have been created, it is thus possible to generate historical records using a computer, without human intervention. The creation of the historical description may therefore be at least partially automated. The risk of error is thereby advantageously limited.

Furthermore, an enrichment method according to the invention advantageously makes it possible, by modifying the view of one and the same model, to generate a large number of historical records. The enrichment method thus preferably comprises, after step 4), the following step:

5) modifying the hyper-realistic view, and then returning to step 3).

In one preferred embodiment, the enrichment method comprises, after step 4) or optional step 5), the following step 6):

6) deforming the historical model, and then returning to step 1).

Step 6) is particularly advantageous. Specifically, it makes it possible to create various historical models that do not exclusively result from measurements on a patient, and in particular from a scan of the patient's dental arch. The historical models may in particular be created so as to simulate dental situations for which few photos are available, for example relating to rare pathologies.

The invention therefore also relates to a method for analyzing an "analysis" photo representing a dental arch of an "analysis" patient, said method comprising the following steps:

A) creating a historical learning base containing more than 1000 historical records, by implementing an enrichment method according to the invention;

B) training at least one "analysis" neural network, by way of the historical learning base;

C) submitting the analysis photo to the trained analysis neural network so as to obtain a description of the analysis photo.

When the historical learning base contains historical records relating to a particular pathology, the analysis neural network thus advantageously makes it possible to evaluate whether the dental scene represented in the analysis photo corresponds to this pathology.

The invention also relates to a method for transforming an "original" view of an "original" digital three-dimensional model, in particular of a model of a dental arch, into a hyper-realistic view, said method comprising the following steps:

21) creating a "transformation" learning base consisting of more than 1000 "transformation" records, each transformation record comprising:
a "transformation" photo representing a scene, and
a view of a "transformation" digital three-dimensional model modeling said scene, or "transformation view", the transformation view representing said scene in the same way as the transformation photo;

22) training at least one "transformation" neural network, by way of the transformation learning base;

23) submitting the original view to said at least one trained transformation neural network, such that it determines said hyper-realistic view.

As will be seen in more detail in the remainder of the description, a transformation method is based on a neural network trained to be able to make a view of a model hyper-realistic. Using the method thus advantageously makes it possible to create a library of hyper-realistic views, providing substantially the same information as photos, without having to take photos.

The transformation method may in particular be used to create a hyper-realistic view of the historical model from an original view of the historical model, in order to enrich a historical learning base in accordance with an enrichment method according to the invention.

Preferably, in step 23), the original view is processed by way of a 3D engine before being submitted to the transformation neural network. The result that is obtained is thereby further improved.

In one embodiment, the method comprises a following additional step:

24) associating the hyper-realistic view with a historical description so as to form historical records of a historical learning base, that is to say so as to perform steps 1) to 4).

The invention also relates to a texturing method for making an "original" digital three-dimensional model hyper-realistic, said method comprising the following steps:

21') creating a "texturing" learning base consisting of more than 1000 "texturing" records, each texturing record comprising:
a non-realistically textured model representing a scene, in particular a dental arch, and a description of this model stating that it is non-realistically textured, or
a realistically textured model representing a scene, in particular a dental arch, and a description of this model stating that it is realistically textured;

22') training at least one "texturing" neural network, by way of the texturing learning base;

23') submitting the original model to said at least one trained texturing neural network, such that it textures the original model so as to make it hyper-realistic.

As will be seen in more detail in the remainder of the description, such a method advantageously makes it possible to create hyper-realistic views by simply observing the original model made hyper-realistic.

To this end, the method also comprises the following step:

24') acquiring a hyper-realistic view by observing the original model made hyper-realistic in step 23').

The methods according to the invention are at least partly, preferably fully computer-implemented. The invention therefore also relates to:
a computer program comprising program code instructions for executing one or more steps of any method according to the invention when said program is executed by a computer,
a storage medium on which such a program is stored, a memory or a CD-ROM for example.

DEFINITIONS

A "patient" is a person for whom a method according to the invention is implemented, regardless of whether or not this person is undergoing an orthodontic treatment.

"Dental care professional" is understood to mean any person qualified to provide dental care, this in particular including an orthodontist and a dentist.

A "dental situation" defines a set of characteristics relating to an arch of a patient at a time, for example the position of the teeth, their shape, the position of an orthodontic device, etc. at this time.

"Model" is understood to mean a digital three-dimensional model. It consists of a set of voxels. A "model of an arch" is a model representing at least one part of a dental arch and preferably at least 2, preferably at least 3 and preferably at least 4 teeth.

For the sake of clarity, a distinction is made between the "division" of a model into "elementary models" and the "segmentation" of an image, in particular of a photo, into "elementary regions". The elementary models and the elementary regions are 3D or 2D representations, respectively, of an element of a real scene, for example of a tooth.

An observation of a model, under defined observation conditions, in particular from a defined angle and from a defined distance, is called a "view".

An "image" is a two-dimensional representation (formed from pixels) of a scene. A "photo" is therefore a particular image, conventionally a color image, taken with a camera. "Camera" is understood to mean any device allowing a photo to be taken, this including a video camera, a mobile telephone, a tablet or a computer. A view is another example of an image.

A tooth attribute is an attribute the value of which is specific to the teeth. Preferably, a value of a tooth attribute is assigned to each tooth region in the view in question or to each tooth model of a dental-arch model in question. In particular, a tooth attribute does not relate to the view or to the model in its entirety. It derives its value from the characteristics of the tooth to which it relates.

A "scene" consists of a set of elements that may be observed simultaneously. A "dental scene" is a scene containing at least one part of a dental arch.

"Photo of an arch", "representation of an arch", "scan of an arch", "model of an arch" or "view of an arch" are understood to mean a photo, a representation, a scan, a model or a view of all or part of said dental arch.

The "acquisition conditions" for a photo or for a view specify the position and orientation in space of a device for acquiring this photo (camera) or of a device for acquiring this view in relation to a dental arch of the patient (real acquisition conditions) or in relation to a model of the dental arch of the patient (virtual acquisition conditions), respectively. The acquisition conditions preferably also specify the calibration of the acquisition device. Acquisition conditions are said to be "virtual" when they correspond to a simulation in which the acquisition device would be in said acquisition conditions (theoretical positioning and preferably calibration of the acquisition device) with respect to a model.

Under virtual acquisition conditions for a view, the acquisition device may also be termed "virtual". The view is specifically acquired by a notional acquisition device, having the characteristics of a "real" camera that would have been used to acquire a photo able to be superimposed on the view.

The "calibration" of an acquisition device consists of all of the values of the calibration parameters. A "calibration parameter" is a parameter intrinsic to the acquisition device (unlike its position and its orientation), the value of which influences the photo or acquired view. The calibration parameters are preferably chosen from the group formed by diaphragm aperture, exposure time, focal length and sensitivity.

"Discriminating information" is characteristic information that may be extracted from an image ("image feature"), conventionally by computerized processing of this image.

Discriminating information may have a variable number of values. For example, contour information may be equal to 1 or 0 depending on whether or not a pixel belongs to a contour. Brightness information may adopt a large number of values. Image processing makes it possible to extract and quantify the discriminating information.

The discriminating information may be represented in the form of a "chart". A chart is thus the result of processing an image in order to reveal the discriminating information, for example the contour of the teeth and gums.

"Match" or "fit" between two objects is the name given to a measure of the difference between these two objects. A match is maximum ("best fit") when it results from an optimization that makes it possible to minimize said difference.

A photo and a view that exhibit a maximum match represent a scene in much the same way. In particular, in a dental scene, the representations of the teeth in the photo and the view are able to be substantially superimposed.

The search for a view exhibiting a maximum match with a photo is performed by searching for the virtual acquisition conditions for the view exhibiting a maximum match with the real acquisition conditions for the photo.

The comparison between the photo and the view preferably results from the comparison of two corresponding charts. "Distance" is the name conventionally given to a measure of the difference between the two charts or between the photo and the view.

A "learning base" is a database of computer records suitable for training a neural network. The training of a neural network is suited to the desired aim and does not pose any particular difficulty to a person skilled in the art.

Training a neural network consists in confronting it with a learning base containing information regarding the two types of object that the neural network has to learn to "match", that is to say to connect to one another.

The training may be performed from a "paired" learning base, consisting of "pair" records, that is to say each comprising a first object of a first type for the input of the neural network, and a corresponding second object, of a second type, for the output of the neural network. It is also said that the input and the output of the neural network are "paired". Training the neural network with all of these pairs teaches it to provide, from any object of the first type, a corresponding object of the second type.

For example, in order for a transformation neural network to be able to transform an original view into a hyper-realistic view, by way of the transformation learning base, it is trained so that it provides at output substantially the transformation photo when it is presented with the corresponding transformation view at input. In other words, the transformation neural network is provided with all of the transformation records, that is to say pairs each time containing a transformation view (view of a model of a dental arch (first object of the first type)) and a corresponding transformation photo (photo of the same dental arch, observed in the same way as the model of the arch is observed in order to obtain the view (second object of the second type)), such that it determines the values of its parameters so that, when a transformation view is presented thereto at input, it transforms it into a hyper-realistic view substantially identical to the corresponding photo (if it were to have been taken).

FIG. 12 illustrates an exemplary transformation record.

It is conventionally said that this training is performed by providing the transformation neural network with the transformation views at input, and the transformation photos at output.

Similarly, the analysis neural network is trained by way of the analysis learning base by providing it with the historical records, such that it determines the values of its parameters so that, when it is presented with a hyper-realistic view at input, it provides a description substantially identical to the historical description corresponding to the hyper-realistic view.

It is conventionally said that this training is performed by providing the analysis neural network with the hyper-realistic views at input, and the historical descriptions at output.

The article "*Image-to-Image Translation with Conditional Adversarial Networks*" by Phillip Isola Jun-Yan Zhu, Tinghui Zhou, Alexei A. Efros, Berkeley AI Research (BAIR) Laboratory, UC Berkeley, illustrates the use of a paired learning base.

Training based on a paired learning base is preferred.

As an alternative, the training may be performed based on a learning base said to be "unpaired" or "pairless". Such a learning base consists of:
 an "output" set consisting of first objects of a first type, and
 an input set consisting of second objects of a second type, the second objects not necessarily corresponding to the first objects, that is to say being independent of the first objects.

The input and output sets are provided at input and at output of the neural network in order to train it. This training of the neural network teaches it to provide, from any object of the first type, a corresponding object of the second type.

Such "unpaired" training techniques are described for example in the article by Zhu, Jun-Yan, et al. "*Unpaired image-to-image translation using cycle-consistent adversarial networks.*"

FIG. 13 illustrates an example of a view of a 3D model of an input set of an unpaired learning base and a photo of an output set of this learning base. The photo does not correspond to the view, in particular because the arch is not observed in the same way and/or because the observed arch is not the same.

For example, the input set may contain non-realistically textured models each representing a dental arch (first objects), and the output set may contain realistically textured models each representing a dental arch (second objects). Even if the arches represented in the input set are different from those represented in the output set, "unpaired" training techniques allow the neural network to learn to determine, for an object of the first type (non-textured model), an object of the corresponding second type (textured model).

Of course, the quality of the learning depends on the number of records in the input and output sets. The number of records in the input set is preferably substantially identical to the number of records in the output set.

According to the invention, an unpaired learning base preferably contains input and output sets each containing more than 1000, more than 5000, preferably more than 10 000, preferably more than 30 000, preferably more than 50 000 and preferably more than 100 000 first objects and second objects, respectively.

The nature of the objects is not exhaustive. An object may be for example an image or a set of information regarding this object, or "description". A description contains values of attributes of another object. For example, an attribute of an image of a dental scene may be used to identify the numbers of the teeth represented. The attribute is then "tooth number" and, for each tooth, the value of this attribute is the number of this tooth.

In the present description, the qualifiers "historical", "original", "transformation" and "analysis" are used for the sake of clarity.

"Comprising" or "including" or "exhibiting" must be interpreted to be non-limiting, unless otherwise indicated.

BRIEF DESCRIPTION OF THE FIGURES

Other features and advantages of the invention will become further apparent on reading the following detailed description and on examining the appended drawing, in which:

FIG. 9 shows an example of a transformation chart relating to the contour of the teeth, obtained from a transformation photo;

FIGS. 10*a* and 10*b* show an original view of a historical model and a corresponding hyper-realistic view, the description of which has inherited some of the description of the historical model, respectively;

DETAILED DESCRIPTION

Figure 1:
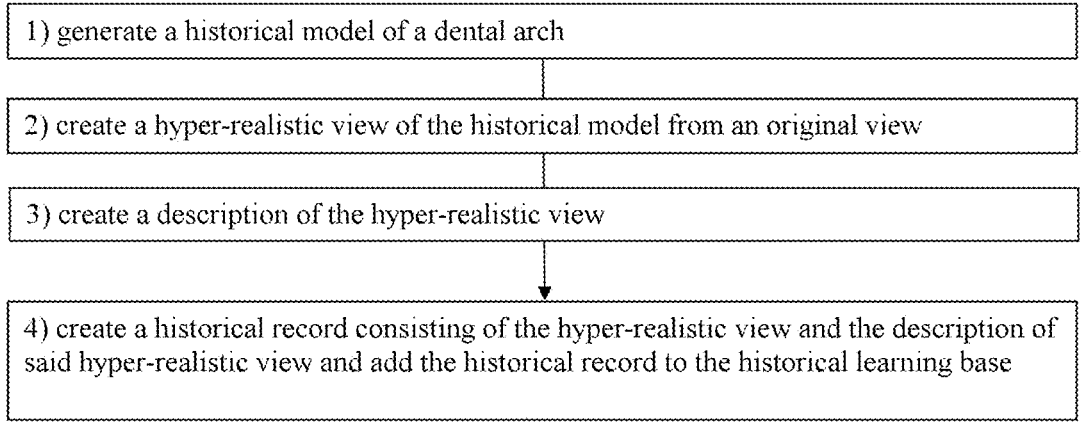
FIGS. 1 to 3 and 11 schematically show the various steps of enrichment, analysis, transformation and texturing methods according to the invention, respectively.
Figure 2:
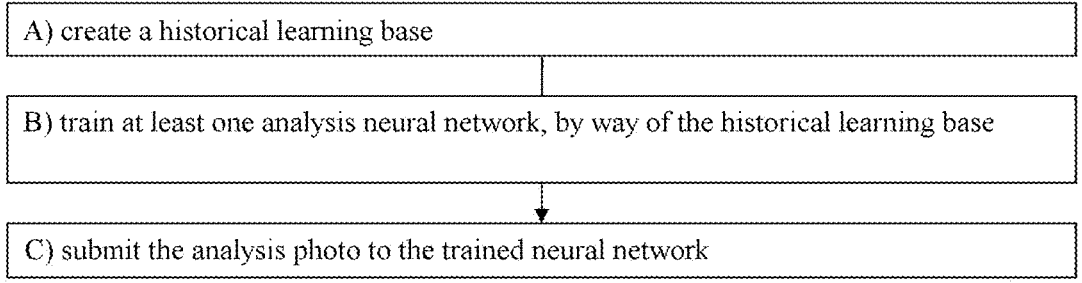
Figure 3:
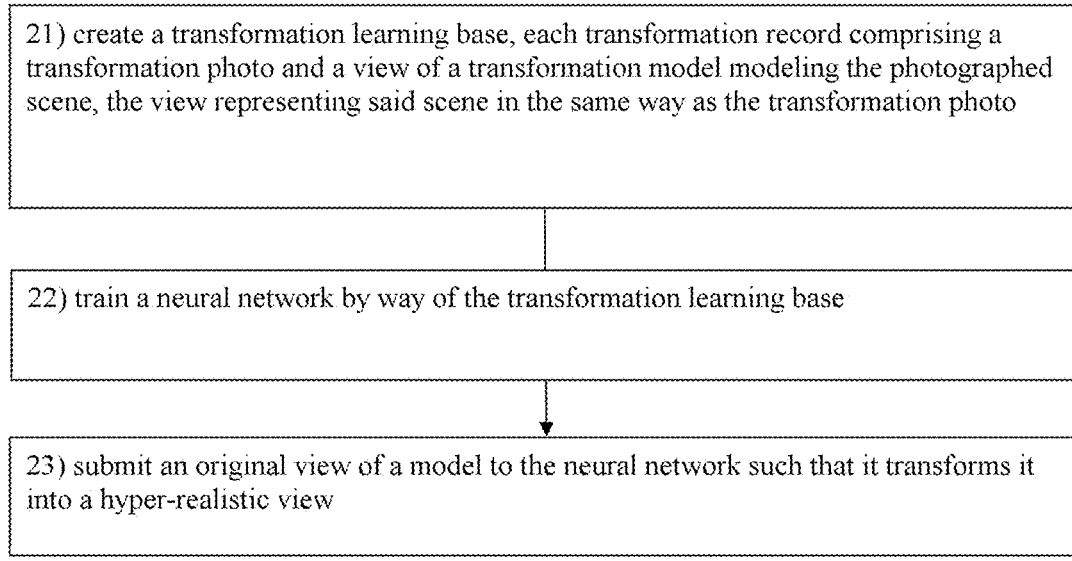
Figure 4:
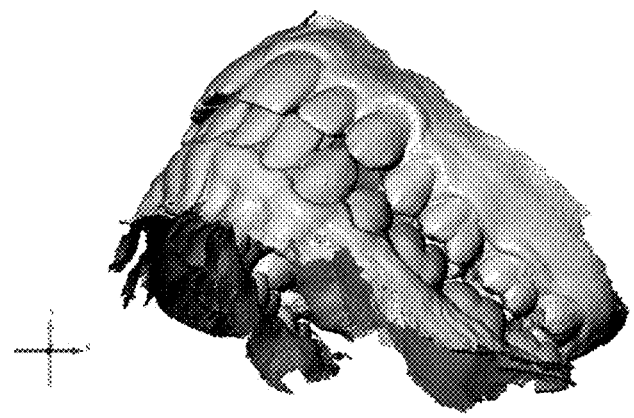
FIG. 4 shows an example of a model of a dental arch.
Figure 5:
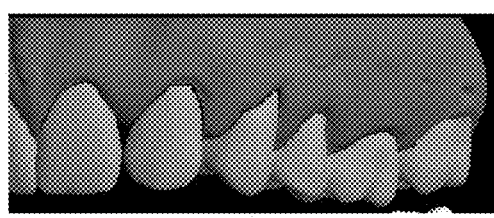
FIG. 5 shows an example of an original view of the model from FIG. 4.
Figure 6:
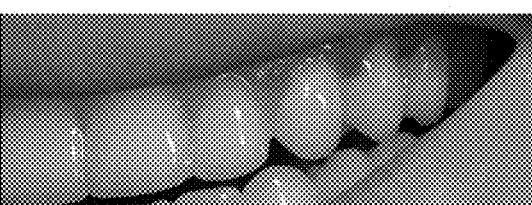
FIG. 6 shows an example of a hyper-realistic view obtained from the original view from FIG. 5.

The following detailed description is that of preferred embodiments, but is not limiting.
Creation of the Historical Learning Base A method for enriching a historical learning base according to the invention comprises steps 1) to 3).

In step 1), a historical model of a dental arch of what is called a "historical" patient is generated.

The historical model may be prepared based on measurements performed on the teeth of the historical patient or on a cast of his teeth, a plaster cast for example.

The historical model is preferably obtained from a real situation, preferably created with a 3D scanner. Such a model, called "3D" model, may be observed from any angle.

In one embodiment, the historical model is theoretical, that is to say does not correspond to a real situation. In particular, the historical model may be created by assembling a set of tooth models chosen from a digital library. The arrangement of the tooth models is defined so that the historical model is realistic, that is to say corresponds to a situation that could be encountered with a patient. In particular, the tooth models are arranged in an arc, depending on their nature, and oriented realistically. Using a theoretical historical model advantageously makes it possible to simulate dental arches exhibiting rare characteristics.

A description of the historical model is preferably also generated.

The "description" of a model consists of a set of data relating to the model in its entirety or to parts of the model, for example to the parts of the model that model teeth.

The historical model is preferably divided. In particular, for each tooth, a model of said tooth, or "tooth model", is preferably defined based on the historical model.

In the historical model, a tooth model is preferably defined by a gingival edge that may be broken down into an inner gingival edge (toward the inside of the mouth in relation to the tooth), an outer gingival edge (oriented toward the outside of the mouth in relation to the tooth) and two lateral gingival edges.

One or more tooth attributes are associated with the tooth models on the basis of the teeth that they model.

A tooth attribute is preferably an attribute that relates only to the tooth modeled by the tooth model.

The tooth attribute is preferably chosen from among a tooth number, a tooth type, a shape parameter of the tooth, for example a tooth width, in particular a mesiopalatal width, a thickness, a crown height, a mesial and distal deflection index of the incisal edge, or an abrasion level, an appearance parameter of the tooth, in particular an index regarding the presence of tartar, dental plaque or food on the tooth, a translucency index or a color parameter, or a parameter relating to the condition of the tooth, for example "abraded", "broken", "decayed" or "fitted" (that is to say in contact with a dental device, for example an orthodontic device), or a parameter relating to a pathology associated with the tooth, for example relating to the presence, in the region of the tooth, of gingivitis, of MIH (molar-incisor hypomineralization), AI (autoimmune hepatitis), fluorosis or necrosis.

A tooth attribute value may be assigned to each tooth attribute of a particular tooth model.

For example, the tooth attribute "tooth type" will have the value "incisor", "canine" or "molar" depending on whether the tooth model is that of an incisor, a canine or a molar, respectively.

The tooth attribute "pathological situation" will have the value "healthy tooth", "broken tooth", "worn tooth", "cracked tooth", "repaired tooth", "tattooed tooth" or "decayed tooth", for example.

The assignment of the tooth attribute values to the tooth models may be manual or at least partly automatic.

Likewise, the tooth numbers are conventionally assigned in accordance with a standard rule. It is therefore sufficient to know this rule and the number of a tooth modeled by a tooth model to calculate the numbers of the other tooth models.

In one preferred embodiment, the shape of a particular tooth model is analyzed so as to define its tooth attribute value, for example its number. This shape recognition may be performed manually. It is preferably performed by way of a neural network.

The definition of the tooth models and the tooth attribute values associated therewith form part of the description of the historical model.

Similarly, it is possible, based on the historical model, to define elementary models other than tooth models, and in particular models for the tongue, and/or the mouth, and/or the lips, and/or the jaws, and/or the gums, and/or a dental device, preferably an orthodontic device, and to assign them values for attributes of the tongue, and/or the mouth, and/or the lips, and/or the jaws, and/or the gums, and/or the dental device, respectively.

A tongue attribute may for example relate to the position of the tongue (for example adopt the value "retracted").

A mouth attribute may for example relate to the opening of the patient's mouth (for example adopt the value "mouth open" or "mouth closed").

An orthodontic device attribute may for example relate to the presence of a dental device and/or relate to its condition (for example adopt the value "device intact", "device broken" or "device damaged").

The description of the historical model may also comprise data relating to the model in its entirety, that is to say values for "model attributes".

For example, a model attribute may define whether the dental situation illustrated by the historical model "is pathological" or "is not pathological", without an examination of each tooth being performed. A model attribute preferably defines the pathology or pathologies from which the historical patient is suffering at the time when the historical model was created.

A model attribute may also define an occlusion class, a position of the mandible in relation to the maxilla ("overbite" or "overjet"), an overall hygiene index or a congestion index, for example.

Transformation into a Hyper-Realistic View

In step 2), a hyper-realistic view of said historical model, that is to say a view that appears to be a photo, is created.

An "original" view of the historical model is preferably chosen and is then made hyper-realistic. The original view is preferably an extraoral view, for example a view corresponding to a photo that would have been taken facing the patient, preferably with a retractor.

Any means for making the original view hyper-realistic are possible. Use is preferably made of what is called a "transformation" neural network, trained to make original views hyper-realistic, and comprising steps 21) to 23).

Image transformation techniques are described in the article by Zhu, Jun-Yan, et al. "*Unpaired image-to-image translation using cycle-consistent adversarial networks.*" This article does not however describe the transformation of a view of a model.

In step 21), what is called a "transformation" learning base consisting of more than 1000 what are called "transformation" records is therefore created, each transformation record comprising:

a "transformation" photo representing a dental scene, and
a view of a "transformation" digital three-dimensional model modeling said scene, or "transformation view", the transformation view representing said scene in the same way as the transformation photo.

The transformation view represents the scene in the same way as the transformation photo when the representations of this scene in the transformation view and in the transformation photo are substantially the same.

The transformation learning base preferably contains more than 5000, preferably more than 10 000, preferably more than 30 000, preferably more than 50 000 and preferably more than 100 000 transformation records. The greater the number of transformation records, the better the ability of the transformation neural network to transform an original view into a hyper-realistic view.

A transformation record is preferably produced as follows for a "transformation" patient:

211) producing a model of a dental arch of the transformation patient, or "transformation model";
212) acquiring a transformation photo representing said arch, preferably by way of a mobile telephone, under real acquisition conditions;
213) searching for suitable virtual acquisition conditions for acquiring a "transformation" view of the transformation model exhibiting a maximum match with the transformation photo under said virtual acquisition conditions, and acquiring said transformation view;

214) combining the transformation photo and the transformation view so as to form the transformation record.

Step 213) may in particular be performed as described in WO 2016/066651.

The transformation photo is preferably processed so as to produce at least one "transformation" chart at least partially representing discriminating information. The transformation chart therefore represents the discriminating information in the reference frame of the transformation photo.

The discriminating information is preferably chosen from the group consisting of contour information, color information, density information, distance information, brightness information, saturation information, information regarding reflections and combinations of this information.

A person skilled in the art knows how to process a transformation photo to reveal the discriminating information.

Figure 7:
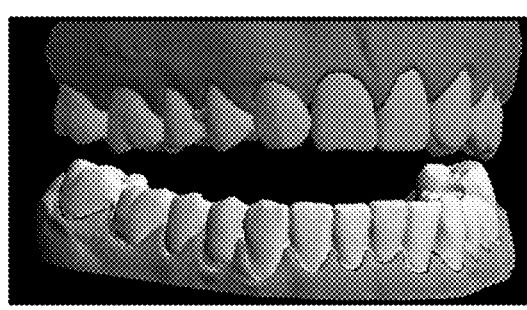
FIG. 7 shows an exemplary transformation photo of a dental arch.
Figure 8:
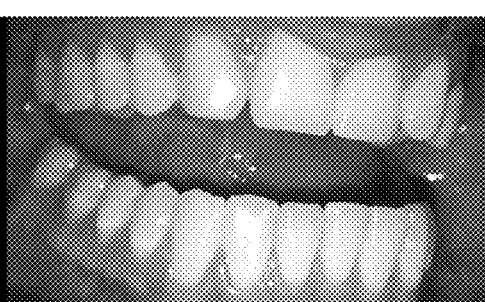
FIG. 8 shows an exemplary transformation view corresponding to the transformation photo from FIG. 7.
Figure 11:
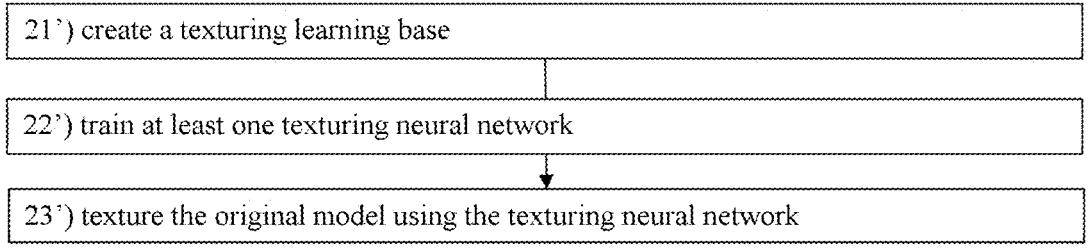
Figure 12:
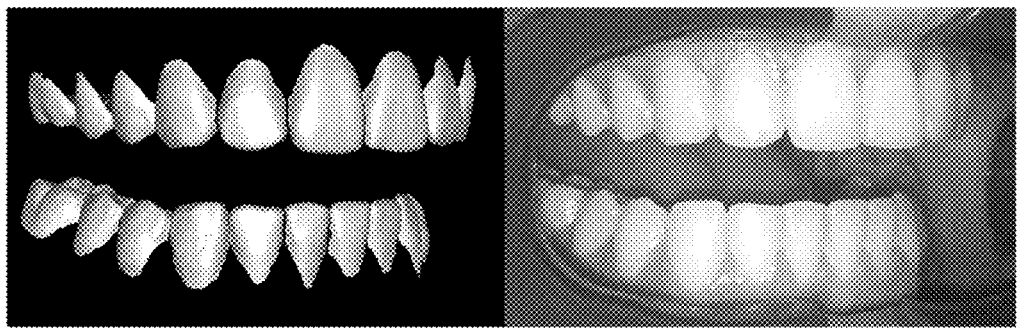
FIG. 12 shows a record in a "paired" learning base, the left-hand image showing a transformation view of a model of a dental arch, to be provided at input of the neural network, and the right-hand image showing a corresponding transformation photo, to be provided at output of the neural network.
Figure 13:
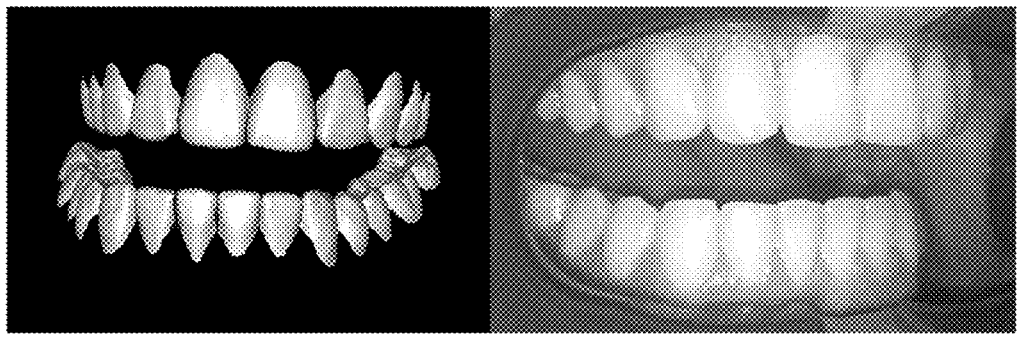
FIG. 13 illustrates an example of a view of a model of an input set of an unpaired learning base and a photo of an output set of this learning base.

For example, FIG. 9 is a transformation chart in relation to the contour of the teeth, obtained from the transformation photo from FIG. 7.

Said search then comprises the following steps:

i) determining virtual acquisition conditions "to be tested";
ii) producing a reference view of the transformation model under said virtual acquisition conditions to be tested;
iii) processing the reference view so as to produce at least one reference chart at least partially representing the discriminating information;
iv) comparing the transformation and reference charts so as to determine a value for an evaluation function, said value for the evaluation function depending on the differences between said transformation and reference charts and corresponding to a decision to continue or to stop the search for virtual acquisition conditions approximating said real acquisition conditions with more accuracy than said virtual acquisition conditions to be tested and determined in the last instance of step i);
v) if said value for the evaluation function corresponds to a decision to continue said search, modifying the virtual acquisition conditions to be tested, and then returning to step ii).

Step i) involves beginning by determining virtual acquisition conditions to be tested, that is to say a virtual position and orientation likely to correspond to the real position and orientation of the camera when capturing the transformation photo, but also preferably a virtual calibration likely to correspond to the real calibration of the camera when capturing the transformation photo.

In step ii), the camera is then virtually configured under the virtual acquisition conditions to be tested in order to acquire a reference view of the transformation model under these virtual acquisition conditions to be tested. The reference view therefore corresponds to the photo that the camera would have taken if it had been placed, in relation to the transformation model, and optionally calibrated, under the virtual acquisition conditions to be tested.

In step iii), the reference view is processed, in the same way as the transformation photo, so as to produce, from the reference view, a reference chart representing the discriminating information.

In step iv), in order to compare the transformation photo and the reference view, their respective discriminating information is compared on the transformation and reference charts. The difference or "distance" between these two charts is in particular evaluated by way of a score. For example, if the discriminating information is the contour of the teeth, it is possible to compare the average distance between the points of the contour of the teeth that appears on the reference chart and the points of the corresponding contour that appears on the transformation chart, the score being higher the smaller this distance.

The score may be for example a correlation coefficient.

The score is then evaluated using an evaluation function. The evaluation function makes it possible to decide whether the cycling through steps i) to v) should be continued or stopped.

In step v), if the value of the evaluation function indicates that it is decided to continue the cycling, the virtual acquisition conditions to be tested are modified and the cycling is restarted in steps i) to v), consisting in producing a reference view and a reference chart, comparing the reference chart with the transformation chart in order to determine a score, and then making a decision on the basis of this score.

Modifying the virtual acquisition conditions to be tested corresponds to a virtual movement in space and/or to modifying the orientation and/or preferably to modifying the calibration of the camera. The modification is preferably guided by heuristic rules, for example by favoring modifications that, according to analysis of the previous scores obtained, appear most favorable for increasing the score.

The cycling is continued until the value of the evaluation function indicates that it is decided to stop this cycling, for example if the score reaches or exceeds a threshold.

The virtual acquisition conditions are preferably optimized using a metaheuristic, preferably evolutionary, method, preferably a simulated annealing algorithm. Such a method is well known for nonlinear optimization.

It is preferably chosen from the group formed by
  evolutionary algorithms, preferably chosen from among:
    evolution strategies, genetic algorithms, differential evolution algorithms, distribution estimation algorithms, artificial immune systems, Shuffled Complex Evolution path recomposition, simulated annealing, ant colony algorithms, particle swarm optimization algorithms, taboo searching, and the GRASP method;
  the kangaroo algorithm,
  the Fletcher and Powell method,
  the noise method,
  stochastic tunneling,
  random-restart hill climbing,
  the cross entropy method, and
  hybrid methods between the abovementioned metaheuristic methods.

If the cycling has been exited without a satisfactory score having been able to be obtained, for example without the score having been able to reach said threshold, the method may be stopped (failure situation) or resumed with new discriminating information. The method may also be continued with the virtual acquisition conditions corresponding to the best achieved score.

If the cycling has been exited with a satisfactory score having been able to be obtained, for example because the score reached or even exceeded said threshold, the virtual acquisition conditions correspond substantially to the real acquisition conditions for the transformation photo, and the reference view has a maximum match with the transformation photo. The representations of the dental scene in the reference view and in the transformation photo are able to be substantially superimposed.

The reference view, representing said dental scene in the same way as the transformation photo, is then chosen as transformation view.

In step 22), the transformation neural network is trained by way of the transformation learning base. Such training is well known to a person skilled in the art.

It conventionally consists in providing all of said transformation views at input of the transformation neural network and all of said transformation photos at output of the transformation neural network.

Through this training, the transformation neural network learns how to transform any view of a model into a hyper-realistic view.

In step 23), an original view of the historical model is submitted to the transformation neural network. The transformation neural network transforms the original view into a hyper-realistic view.

As an alternative to steps 21) to 23), step 2) may comprise the following steps, firstly to make the historical model hyper-realistic, and then to extract a hyper-realistic view therefrom:

21') creating a "texturing" learning base consisting of more than 1000 "texturing" records, each texturing record comprising:
   a non-realistically textured model representing a dental arch, for example a scan of a dental arch, and a description of said model stating that it is non-realistically textured, or
   a realistically textured model representing a dental arch, for example a scan of a dental arch made hyper-realistic, and a description of said model stating that it is realistically textured, or 22') training at least one "texturing" neural network, by way of the texturing learning base;

23') submitting the historical model to said at least one trained texturing neural network, such that it textures the historical model so as to make it hyper-realistic.

A hyper-realistic view may then be obtained directly by observing said hyper-realistic historical model.

"Texturing" is understood to mean transforming a model so as to give it a hyper-realistic appearance, similar to that which an observer of the real dental arch might observe. In other words, an observer of a hyper-realistically textured model has the impression of observing the dental arch itself.

In step 21'), the non-realistically textured models may be generated as described above for the generation of the historical models.

The realistically textured models may be generated by texturing initially non-realistically textured models. A method for generating a hyper-realistic model comprising steps A") to C"), in which the original model is an initially non-realistically textured model, is preferably implemented.

In step 22'), the training may in particular be performed following the teachings in the article by Zhu, Jun-Yan, et al. "*Unpaired image-to-image translation using cycle-consistent adversarial networks*" (Open access Computer Vision Foundation).

Through this training, the texturing neural network learns to texture a model so as to make it hyper-realistic. In particular, it learns to texture dental arch models.

In step 2), a hyper-realistic view of a 3D model may also be obtained by processing the original image by way of a conventional 3D engine.

A 3D engine is a software component that makes it possible to simulate, on a digital three-dimensional object, the effects of the environment, and in particular lighting effects, optical effects, physical effects and mechanical effects on the corresponding real object. In other words, the 3D engine simulates, on the digital three-dimensional object, physical phenomena at the origin of these effects in the real world.

For example, a 3D engine, on the basis of the relative position of a "virtual" light source with respect to a digital three-dimensional object and the nature of the light projected by this light source, will calculate the appearance of this object, for example so as to reveal shadows or reflections. The appearance of the digital three-dimensional object thus simulates the appearance of the corresponding real object when it is illuminated in the same way as the digital three-dimensional object.

A 3D engine is also called a 3D rendering engine, graphics engine, game engine, physics engine, or 3D modeler. Such an engine may in particular be chosen from among the following engines, or their variants:

Arnold
Aqsis
Arion Render
Artlantis
Atomontage
Blender
Brazil r/s
BusyRay
Cycles
FinalRender
Fryrender
Guerilla Render
Indigo
Iray
Kerkythea
KeyShot
Kray
Lightscape
LightWorks
Lumiscaphe
LuxRender
Maxwell Render
Mental Ray
Nova
Octane
Povray
RenderMan
Redsdk, Redway3d
Sunflow
Turtle
V-Ray
VIRTUALIGHT
YafaRay.

In one particularly advantageous embodiment, the original view is firstly processed by way of a 3D engine, and then submitted to the transformation neural network, as described above (step 23). Combining these two techniques has made it possible to achieve remarkable results.

In one embodiment, the original view may firstly be submitted to the transformation neural network, and then be processed by way of a 3D engine. This embodiment is however not preferred.

In one embodiment, a hyper-realistic view obtained directly by observing a textured hyper-realistic historical model in accordance with steps 21') to 23') is processed by way of a 3D engine. This additional processing also improves the realistic appearance of the image that is obtained.

In step 3), a description for the hyper-realistic view is created.

The description of a hyper-realistic view consists of a set of data relating to said view in its entirety or to parts of said view, for example to the parts of said view that represent teeth.

In the same way as the description of the historical model, the description of a hyper-realistic view may comprise values for attributes of teeth and/or the tongue, and/or the mouth, and/or the lips, and/or the jaws, and/or the gums, and/or the dental device represented in the hyper-realistic view. The abovementioned attributes for the description of the historical model may be attributes of the description of the hyper-realistic view.

The description of a hyper-realistic view may also comprise values for view attributes, that is to say relating to the hyper-realistic view or to the original view in its entirety. A view attribute may in particular relate to
- a position and/or an orientation and/or a calibration of a virtual camera used to acquire the original view, and/or
- a quality of the hyper-realistic view, and in particular relating to the brightness, to the contrast or to the sharpness of the hyper-realistic view, and/or
- the content of the original view or of the hyper-realistic view, for example relating to the arrangement of the objects represented, for example in order to specify that the tongue is masking certain teeth, or relating to the therapeutic or non-therapeutic situation of the patient.

The description of the hyper-realistic view may be formed at least partially manually.

It is preferably produced at least partially, preferably completely, through inheritance from the historical model, preferably by a computer program.

In particular, if the historical model has been divided, the virtual acquisition conditions make it possible to ascertain the elementary models of the historical model that are represented in the hyper-realistic view, as well as their respective locations. The values of the attributes relating to said elementary models, available in the description of the historical model, may therefore be assigned to the same attributes relating to the representations of said elementary models in the hyper-realistic view.

For example, if the historical model has been divided so as to define tooth models, and the description of the historical model specifies a number for a tooth model, the same number may be assigned to the representation of this tooth model in the hyper-realistic view.

FIG. 10a shows an original view of a historical model that has been divided in order to define tooth models. The description of the historical model contains the tooth numbers of the historical model.

The values of at least some of the attributes of the description of a hyper-realistic view may thus be inherited from the description of the historical model.

In step 4), a historical record consisting of the hyper-realistic view and the description of said hyper-realistic view is created and is added to the historical learning base.

The historical learning base may consist only of historical records generated in accordance with an enrichment method according to the invention. As an alternative, the historical learning base may contain historical records generated in accordance with an enrichment method according to the invention and other historical records, for example created in accordance with conventional methods, in particular by labeling photos.

In step 5), which is optional, the hyper-realistic view of the historical model is modified, and there is then a return to step 3).

To modify the hyper-realistic view, a new hyper-realistic view is preferably created from a new original view.

By performing a cycle of steps 3) to 5), it therefore becomes possible to create numerous historical records corresponding to various observation conditions of the historical model. A single historical model thus makes it possible to create numerous historical records, without even having a photo.

In step 6), the historical model is preferably deformed. The deformation may in particular consist in
- moving a tooth model, for example so as to simulate a spacing between two teeth,
- deforming a tooth model, for example so as to simulate bruxism,
- deleting a tooth model,
- deforming a jaw model.

In one embodiment, the deformation simulates a pathology.

Step 6) leads to a theoretical historical model that advantageously makes it possible to easily simulate dental situations for which measurements are not available.

There is then a return to step 2). Based on an initial historical model, it is therefore possible to obtain historical records relating to a dental situation different from that corresponding to the initial historical model. In particular, it is possible to create historical records for historical models corresponding to different stages of a rare pathology.

The historical learning base preferably contains more than 5000, preferably more than 10 000, preferably more than 30 000, preferably more than 50 000 and preferably more than 100 000 historical records.

Analysis of an Analysis Photo

To analyze an analysis photo, steps A) to C) are performed.

The method preferably comprises a preliminary step during which the analysis photo is acquired with a camera, preferably chosen from among a mobile telephone, what is called a "connected" camera, what is called a "smartwatch", a tablet or a fixed or portable personal computer, including a photo acquisition system. The camera is preferably a mobile telephone.

More preferably, when acquiring the analysis photo, the camera is spaced from the dental arch by more than 5 cm, more than 8 cm, or even more than 10 cm, this preventing the condensation of water vapor on the optics of the camera and facilitating focusing. Furthermore, preferably, the camera, in particular the mobile telephone, is not provided with any specific optics for acquiring the analysis photos, this especially being possible due to the spacing from the dental arch during the acquisition.

An analysis photo is preferably a color photo, preferably a real-color photo.

The analysis photo is preferably acquired by the patient, preferably without using a holder to immobilize the camera, and in particular without a tripod.

In step A), a historical learning base containing historical records obtained in accordance with an enrichment method according to the invention is created.

In step B), an "analysis" neural network is trained by way of the historical learning base. Such training is well known to a person skilled in the art.

The neural network may in particular be chosen from the list provided in the preamble of the present description.

Through this training, the analysis neural network learns to evaluate, for the photos presented thereto, values for the attributes evaluated in the historical descriptions.

For example, each historical description may specify a value ("yes" or "no") for the attribute "presence of a malocclusion?".

The training conventionally consists in providing all of said hyper-realistic views as input of the analysis neural network, and all of said historical descriptions at output of the analysis neural network.

In step C), the analysis photo is presented to the analysis neural network, and an evaluation is thus obtained for the various attributes, for example "yes", with a probability of 95%, for the presence of a malocclusion.

The analysis method may be used for therapeutic or non-therapeutic purposes, for example for research purposes or for purely esthetic purposes.

It may be used for example to evaluate a dental situation of a patient during orthodontic treatment, or a teeth-whitening treatment. It may be used to monitor the movement of teeth or the evolution of a dental pathology.

In one embodiment, the patient takes the analysis photo, for example with his mobile telephone, and a computer, integrated into the mobile telephone or with which the mobile telephone is able to communicate, implements the method. The patient may thus very easily request an analysis of his dental situation, without even having to move, by making do with transmitting one or preferably several photos of his teeth.

Analyzing an analysis photo is particularly useful for detecting a rare disease.

Simulation of a Dental Situation

A transformation method according to the invention may also be implemented so as to generate a hyper-realistic view representing a dental situation simulated by way of a digital three-dimensional model of a dental arch. In particular, the dental situation may be simulated at a past or future simulation time, within the context of a therapeutic or non-therapeutic treatment.

The invention thus relates to a method for simulating a dental situation, comprising the following steps:
  A') at an updated time, generating a digital three-dimensional model of a dental arch of a patient, called "updated model", preferably as described above in step 1);
  B') deforming the updated model so as to simulate the effect of time between the updated time and a simulation time, before or after the updated time, for example by more than 1 week, 1 month or 6 months, so as to obtain a "simulation model", preferably as described above in step 6);
  C') acquiring a view of the simulation model, or "original simulation view";
  D') transforming the original simulation view into a hyper-realistic simulation view, in accordance with a transformation method according to the invention.

The hyper-realistic simulation view thus appears in the same way as a photo that would have been taken at the simulation time. It may be presented to the patient in order to present him for example with his future or past dental situation, and thus motivate him to pursue an orthodontic treatment.

In step A'), the updated model is preferably divided into elementary models, preferably as described above in step 1). In step B'), the deformation may thus result from a movement or a deformation of one or more elementary models, and in particular of one or more tooth models, for example so as to simulate the effect of an orthodontic device.

Transformation of a Model

A view of an original model made hyper-realistic in accordance with a transformation method according to the invention may advantageously be used to make the original model itself hyper-realistic.

The invention thus also relates to a method for generating a hyper-realistic model from an original model, and in particular from an original model of a dental arch, said method comprising the following successive steps:
  A") acquiring an original view of the original model;
  B") transforming the original view into a hyper-realistic view, in accordance with a transformation method according to the invention;
  C") for each pixel of the hyper-realistic view, identifying a corresponding voxel of the original model, that is to say represented by said pixel in the hyper-realistic view, and assigning a value of an attribute of the pixel to an attribute of the voxel.

The attribute of the pixel may in particular relate to its appearance, for example to its color or to its brightness. The attribute of the voxel is preferably the same as the attribute of the pixel. The color of the pixel is thus assigned for example to the voxel.

The methods according to the invention are at least partly, preferably fully computer-implemented. Any computer may be contemplated, in particular a PC, a server or a tablet.

A computer conventionally comprises in particular a processor, a memory, a human-machine interface, conventionally comprising a screen, a module for communication via the Internet, via Wi-Fi, via Bluetooth® or via the telephone network. Software configured so as to implement the method of the invention in question is loaded into the memory of the computer.

The computer may also be connected to a printer.

Of course, the invention is not limited to the embodiments described above and shown.

In particular, the patient is not limited to a human being. A method according to the invention may be used on another animal.

A learning base does not necessarily consist of records of "pairs". It may be unpaired.

The transformation learning base may for example contain
  an input set consisting of "input views" each representing a view of a transformation digital three-dimensional model modeling a dental scene, preferably more than 1000, more than 5000, preferably more than 10 000, preferably more than 30 000, preferably more than 50 000 and preferably more than 100 000 input views, and
  an "output" set consisting of "output photos" each representing a dental scene, preferably more than 1000, more than 5000, preferably more than 10 000, preferably more than 30 000, preferably more than 50 000 and preferably more than 100 000 output photos,
the output photos being able to be independent of the output views, that is to say not represent the same dental scenes.

The texturing learning base may for example contain
  an input set consisting of non-realistically textured models each representing a dental arch, preferably more than 1000, more than 5000, preferably more than 10 000, preferably more than 30 000, preferably more than 50 000 and preferably more than 100 000 non-realistically textured models, and
  an output set consisting of realistically textured models each representing a dental arch, preferably more than 1000, more than 5000, preferably more than 10 000, preferably more than 30 000, preferably more than 50 000 and preferably more than 100 000 realistically textured models, the realistically textured models being able to be independent of the non-realistically textured models, that is to say not represent the same dental arches.

The invention claimed is:

1. A method for transforming an "original" view of an "original" digital three-dimensional model of a dental arch into a hyper-realistic view being equivalent to photos, said method comprising the following steps:

21) creating a "transformation" learning base that is unpaired or paired, when paired, the transformation learning base consisting of more than 1000 "transformation" records, each transformation record comprising:

a "transformation" photo representing a dental scene, and a view of a "transformation" digital three-dimensional model modeling said dental scene, or "transformation view", the transformation view representing said scene in the same way as the transformation photo, when unpaired, the transformation learning base consisting of:

an output set consisting of more than 1000 transformation photos representing a dental scene, and an input set consisting of more than 1000 transformation views;

22) training at least one "transformation" neural network, by way of the transformation learning base, such that the transformation neural network learns how to transform any view of any digital three-dimensional model into a hyper-realistic view;

23) submitting the original view to said at least one transformation neural network, such that the transformation neural network transforms the original view into a hyper-realistic view;

24) associating the hyper-realistic view with a historical description so as to form historical records of a historical learning base so as to train at least one analysis neural network;

a hyper-realistic view providing substantially the same information as photos.

2. The transformation method as claimed in claim 1, wherein, in step 23), the original view is processed by way of a 3D engine before being submitted to the transformation neural network.

3. The transformation method as claimed in claim 1, wherein the original view is an extraoral view.

* * * * *